June 22, 1948.   L. R. GRUSS   2,443,730
SHOCK ABSORBER
Filed March 15, 1944   2 Sheets-Sheet 1
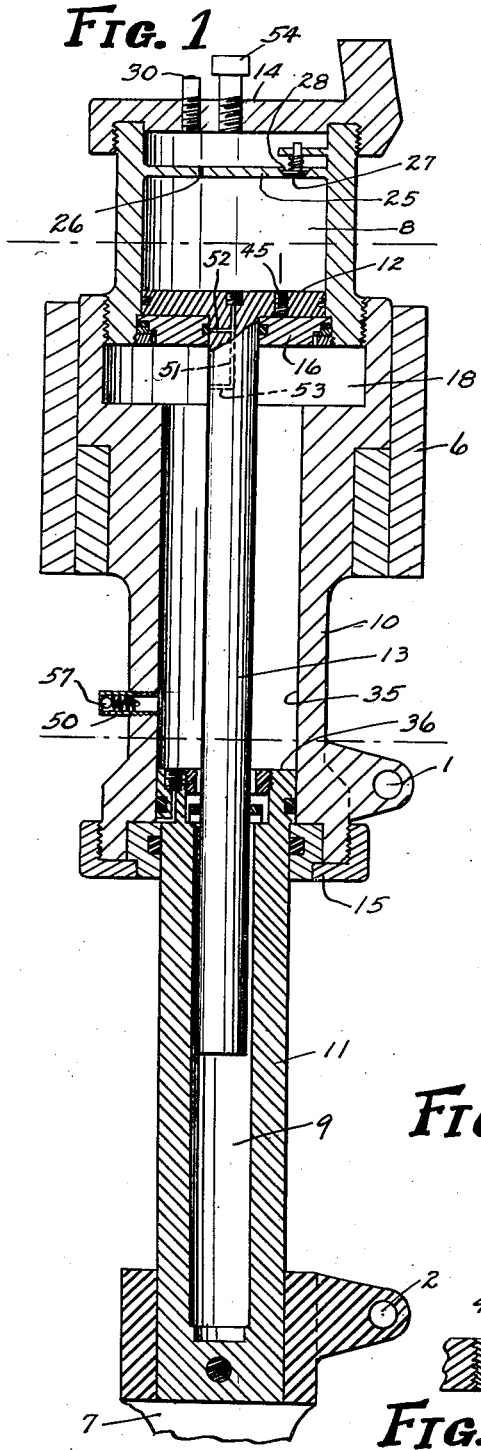
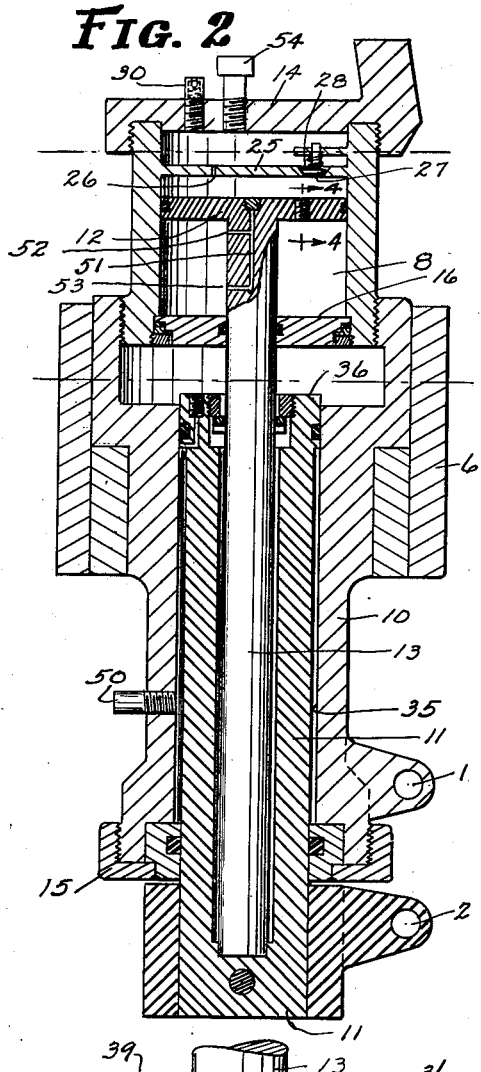
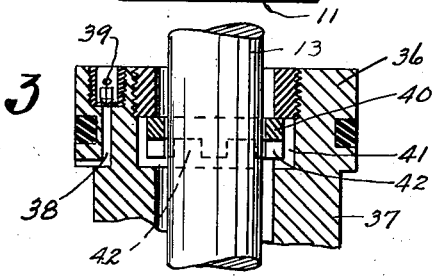
INVENTOR.
LUCIEN R. GRUSS
BY
ATTORNEYS

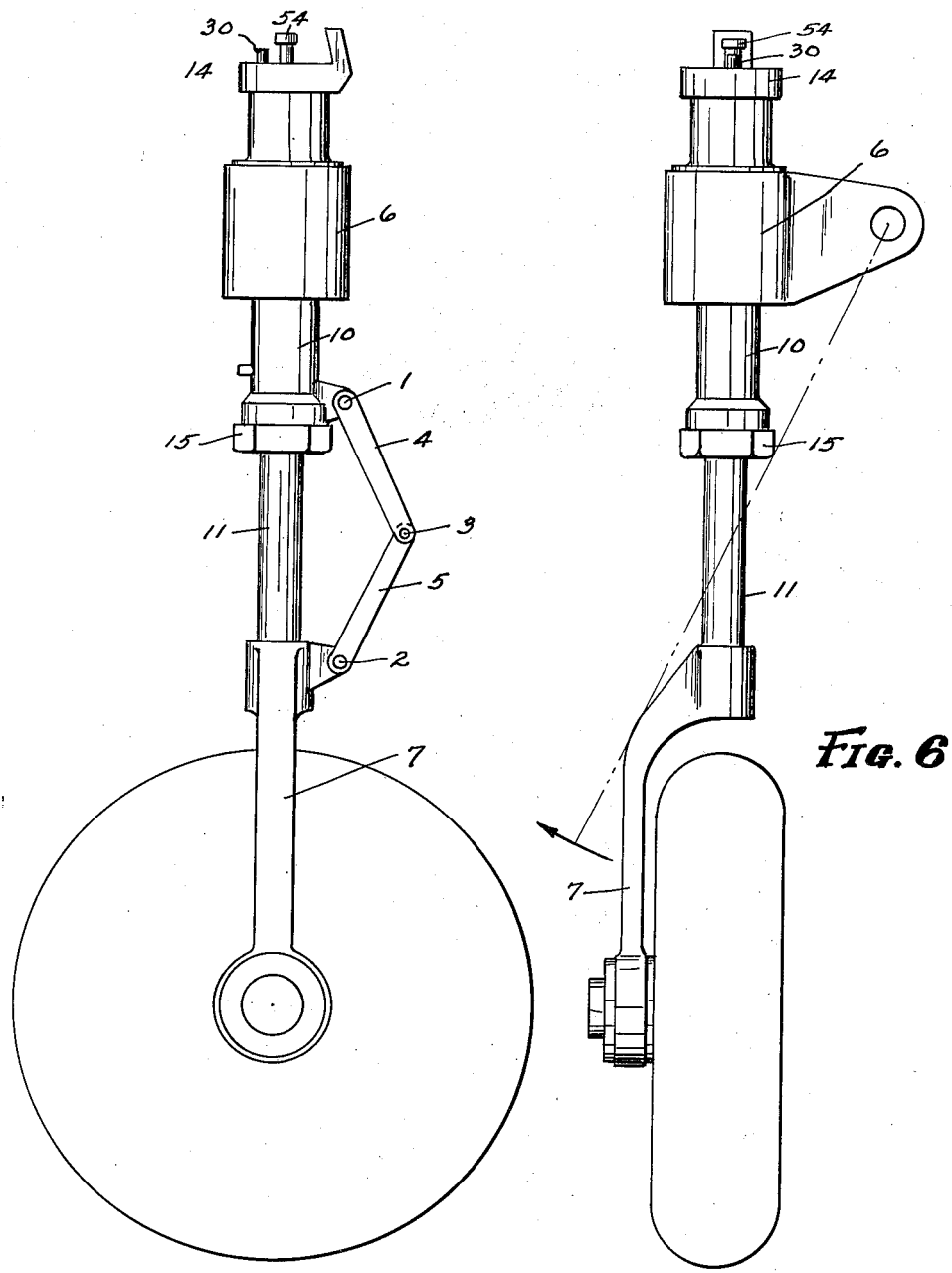

Patented June 22, 1948

2,443,730

UNITED STATES PATENT OFFICE 2,443,730

SHOCK ABSORBER

Lucien R. Gruss, Middletown, Ohio

Application March 15, 1944, Serial No. 526,498

9 Claims. (Cl. 267—64)

This invention relates to shock absorbers for use between two relatively movable members, such for example in connection with the landing gear of aircraft, or the spring suspension of any motor vehicle. The invention constitutes an improvement on the structure shown in my copending application, Serial No. 503,324, filed September 22, 1943.

As applied to aircraft work, my copending application briefly embodies two telescopically movable members, each of which is mounted on one of the relatively movable parts, and one of which has a pin-like ram that operates against fluid under pressure in a cylinder of the other. The shock incident to the landing is absorbed by the restricted flow of fluid past the plunger as it moves progressively into the cylinder.

The present invention embodies an improvement over the prior construction in that it utilizes a floating ram, one end of which operates against fluid under pressure in a cylinder within one of the telescopic members, and the other end of which operates against fluid under pressure in a cylinder within the other telescopic member. This improves the cushioning effect, strengthens the bearing construction and reduces the overall length required for the shock absorber.

A further object of the present invention is to simplify the construction and reduce the possibility of leakage of the shock absorbing liquid.

Referring now to the drawings, Fig. 1 illustrates a vertical section taken longitudinally through a shock absorber embodying the present invention and showing the position of the parts when the airplane (in the case of aircraft) is off the ground; Fig. 2 is a section similar to Fig. 1, but showing the position of the parts when the airplane is on the ground and when the shock absorber parts have reached the approximate limit of their travel of their movement toward each other; Fig. 3 is a section through a portion of the operating parts, illustrating them on a scale larger than that shown in either Fig. 1 or 2, and Fig. 4 is a section taken on a plane indicated by the line 4—4 in Fig. 2, and Figs. 5 and 6 are side and end views respectively showing the device in elevation.

The invention as aforesaid is adapted for use between any two relatively movable parts, such for example, as the wing and landing wheel support respectively of an airplane, or the chassis frame and axle housing of a motor vehicle. In the case of an airplane, my invention includes a member 10 which may be pivotally attached in the customary way through the band 6 to the wing and a member 11 which may be attached in the usual way to a wheel supporting bracket 7. Such members are telescopically mounted with respect to each other and each has a cylinder 8 and 9 therein respectively, shown as preferably being an axial alignment, and as having a floating piston or ram operating against a liquid and air cushion in each cylinder. Preferably, a piston 12 operates in the cylinder 8 and has a fluid tight seal at its peripheral portion with the wall of the cylinder and has a rod 13 which extends into the cylinder 9 and operates as a ram therein. For this purpose, the rod is smaller in diameter than the bore of the cylinder 9 so as to drive liquid in the cylinder out of it as the ram moves downwardly therein. Such action takes place when the members move from the position shown in Fig. 1 to that shown in Fig. 2. The members are kept in alignment by means of links 4 and 5 which are respectively connected to the members at 1 and 2, and are pivotally connected together at 3.

The member 10 is enclosed at the upper end by a head 14 and at the bottom by a cap 15, and is provided intermediately with a partition 16 which has an aperture through which the rod 13 extends. The partition divides the member into the cylinder 8 and a chamber 18 and has a fluid tight seal with the walls of the cylinder and the wall of the piston rod respectively. The cylinder 8 above the piston 10 is partially filled with a liquid, such as oil, and has a partition 25 therein adjacent the upper portion thereof, which has a permanently open restricted passageway 26 extending therethrough, together with a larger opening 27 in which a spring pressed valve 28 is positioned. The valve is normally urged to closing position in a downward direction. The space above the oil is filled with air under pressure, that may be supplied initially through a valve 30 sufficient to keep the piston 12 away from the partition 16 when the plane is standing on the ground. Such arrangement enables the piston 12 as it moves upwardly in the cylinder 8 to work against the liquid and gas under pressure therein, the valve 28 operating to permit the fluid to move rapidly therethrough in an upward direction, but to cause it to move at a more restricted rate in the opposite direction solely through the opening 26. This cushions the rebound and avoids an objectionable jerk on the wings of the airplane.

The member 11, which as aforesaid is attached to the lower part to which this structure is applied, has a bearing against a cylindrical wall 35 of the chamber 18 and for this purpose the upper end of the member 11 is enlarged in diameter to provide a head 36 as is shown in Fig. 3. The reduced portion of the member 11 beneath the head, as shown at 37 in Fig. 3, provides clearance between the member and the wall 35 so that any liquid which may seep past the head 36 is forced backwardly into the chamber 18 through a passageway 38 and the valve 39 in the head, whenever the members are extended to the position of Fig. 1. Thus, the structure is hydraulically sealed at all times.

The cylinder 9 has therein a shock absorbing liquid which is forced upwardly and into the chamber 18 as the ram 13 descends within the cylinder, and flows backwardly into the cylinder as the ram is withdrawn therefrom. There is interposed between the cylinder and chamber a device for effecting a differential rate of flow of liquid therebetween as the ram ascends and descends, and such device may take the form of a floating valve 40 which is illustrated as an annulus that embraces the ram and is movable in a direction axially thereof within a recess 41 in the head 36. Such valve has a clearance with the wall of the ram so as to permit a restricted flow of liquid from the cylinder 9 into the chamber 18 during the compression stroke of the ram 13, during which time the valve is forced upwardly against the seat which comprises the top wall of the recess 41. On the reverse stroke of the ram, however, the valve drops downwardly to the seat which forms the bottom wall of the recess 41, during which time the liquid may flow at an increased rate from the chamber 18 into the cylinder 9 through spaced passageways 42 in the side bottom portion of the valve.

The present invention is well adapted for preventing the seepage of oil or other liquid used as a shock absorbing medium in that any liquid which seeps past the head 36 is forced upwardly into the chamber 18 through the valve 39 as the members 10 and 11 move away from each other, and in that any liquid which seeps past the piston 12 is forced upwardly into the cylinder 8 through a valve 45 which is shown in Fig. 4 as being located in a passageway within the piston 12. The oil levels in the various chambers are indicated by the dot and dash lines extending across Figures 1 and 2.

The present invention retains the feature of automatic pumping of air into the cylinder above the piston 12 as the airplane skips along the ground during a take-off operation, because air may enter the chamber 18 through a breather pipe 50 which has the customary check valve (57—shown) therein and air may pass from the chamber 18 into the cylinder 8 beneath the piston 12 through the passageway 51 in the ram 13 when the upper end 52 of the passageway is above the partition 16, while the lower end 53 thereof is below the partition 16. This equalizes any pressure differential between the chambers 8 and 18, and then on the downstroke of the piston 12, any air that is trapped in the cylinder 8 below the piston, and after the upper end 52 of the passageway clears the partition 16, is forced upwardly into the space above the piston 12 through the valve 45. Thus repeated reciprocations of the piston builds up an air pressure above the piston to an amount that is determined by a pressure relief valve 54 which may be set to keep the pressure from exceeding a predetermined maximum amount.

Assuming that a structure embodying my invention has the telescopic members attached respectively to the upper and lower relatively movable parts of the article which requires a shock absorbing medium, and assuming further that there is an adequate quantity of liquid in the cylinder 9 to occupy the chamber 18 when the parts are in retracted position as shown in Fig. 2, and that there is sufficient liquid above the piston 12 and air pressure above that to support the piston in the position shown in Fig. 2 in retracted position, then as the relatively movable parts move away from each other (consequent upon the airplane leaving the ground), the piston rod or ram 13 is moved upwardly in the cylinder 9 until the head 36 on the member 11 strikes the cap 15 on the member 10. At such time the piston 12 will have moved downwardly to the position shown in Fig. 1. Assuming then that the plane is skipped along the ground, then as the wheels strike the ground, the member 11 moves toward the member 10, whereby the piston 12 compresses the air above it in cylinder 8 and the ram 13 forces the liquid in the cylinder 9 upwardly into the chamber 18, thereby making a conjoint liquid and gaseous cushioning means which operates in a satisfactory manner to afford an extended length of travel of the shock absorbing members without permitting a sudden impact of an unyielding nature between any two relatively movable members. The skipping operation may be continued until the pressure above the piston 12 is built up, as aforesaid, sufficient to absorb the landing shock.

An important advantage of the present invention is the fact that the various parts may be readily manufactured and assembled, and that they coact to provide an effective and satisfactory cushioning medium, while at the same time retaining the advantage of automatically building up the pressure within the structure consequent upon a skipping action of the airplane along the ground. The invention additionally is advantageous in that the liquid therein cannot escape therefrom during the operation of the device.

I claim:

1. A shock absorbing device for use between two relatively movable parts, comprising two telescopically movable members, each mounted on one of the relatively movable parts, one of the members having a partition therein dividing it into a cylinder and a chamber, the other member having a cylinder therein having one end thereof open to the chamber in the first-mentioned member, a piston operating in the cylinder of the first mentioned member and having a shank extending through the partition and into the cylinder in the other of said members and operating as a ram therein, each of said cylinders having fluid therein in against which the piston and ram respectively are adapted to operate, said partition operating to prevent the passage of fluid between the cylinders, the piston forming a peripheral seal with the walls of its associated cylinder and the ram having a clearance with the walls of its associated cylinder.

2. A shock absorber for use between two relatively movable parts, comprising two telescopically movable members, each mounted on one of the relatively movable parts, one of said members having a partition dividing it into a cylinder and a chamber, the other of said members having a cylinder closed at one end but open at the other into said chamber, the first-mentioned cylinder having a partition and having a fluid passageway therethrough providing communication from one side to the other thereof, and a floating ram having a portion thereof disposed in each cylinder and operating against fluid pressure therein.

3. A shock absorber for use between two relatively movable parts, comprising two telescopically movable members, each mounted on one of the relatively movable parts, one of said members having a partition therein dividing it into a cylinder and a chamber, and the other of said members having a cylinder therein closed at one end and opening at the other end into said chamber, each of said cylinders being partially filled with liquid, a piston operating in the first-mentioned cylinder and having its peripheral portion sealed against the passage of liquid from one side thereof to the other, said piston having a rod projecting through the partition and operating as a ram in the other of said cylinders, said ram having a clearance between its peripheral surface and the walls of the associated cylinder, whereby, on descent of the ram, liquid in said cylinder is forced axially thereof into said clearance space, out of the cylinder, and into said chamber, and whereby, upon ascent of the piston, liquid in the first-named cylinder is forced ahead of the piston, said partition operating to prevent the transfer of liquid from one cylinder to the other during use.

4. A shock absorbing device for use between two relatively movable parts, comprising two members adapted to be attached to the respective parts and telescopically movable with respect to each other, one of said members having a partition therein dividing it into a cylinder and a chamber, and the other member having a cylinder therein opening into said chamber, means providing communication between the atmosphere and the chamber whenever the pressure within the chamber drops below that of the atmosphere, a piston operating in one of the cylinders and having a rod extending through said partition and chamber and operating in the other of said cylinders, said rod having a longitudinally extending passageway therein opening at spaced intervals onto the surface thereof, the distance between said openings being greater than the thickness of said partition, whereby the rod during reciprocation thereof provides communication between the chamber and cylinder on one side of said piston, and said piston having a check valve therein operating to permit the flow of air from the underside thereof to the upper side thereof, whenever the upper opening in said passageway is beneath said partition, whereby the air pressure on top of the piston is automatically increased as the piston is reciprocated, and means in communication with the cylinder above said piston to limit the degree of pressure attainable therein.

5. A shock absorbing device for use between two relatively movable parts comprising two telescopic members, one of said members constituting a cylinder, the other member having a chamber into which the cylinder telescopes and carrying a second cylinder separated by a partition from said chamber, a piston in the second cylinder, a rod connected to said piston and slidable through said partition and extending as a ram into the first cylinder, means for controlling communication from the chamber to the space above the partition and means to control the rate of flow from the ram cylinder to said chamber restricting it more in the outgoing than the incoming direction.

6. A shock absorbing device for use between two relatively movable parts comprising two telescopic members, one of said members constituting a cylinder, the other member having a chamber into which the cylinder telescopes and carrying a second cylinder separated by a partition from said chamber, a piston in the second cylinder, a rod connected to said piston and slidable through said partition and extending as a ram into the first cylinder, means operated by the movement of the piston for controlling communication from the chamber to the space between the partition and piston, and a floating ring encircling the ram and adapted to control the rate of flow from the ram cylinder to said chamber.

7. A shock absorbing device for use between two relatively movable parts comprising two telescopic members, one of the members having a cylinder and the other member having a chamber and carrying a second cylinder separated by a partition from said chamber, a piston in the second cylinder, a rod connected to said piston and slidable through said partition and operating a ram on the first cylinder, there being a passageway through the piston rod which passageway in one position of the rod extends from said chamber to the space between said piston and partition, and a valve carried by the piston for allowing the passage of air from beneath the piston into the space above the piston.

8. A shock absorbing device for use between two relatively movable parts comprising a cylinder and a second cylinder telescopically movable with reference to the first cylinder, a piston operating in the first cylinder and having an extension thereon operating in the second cylinder, means disposed adjacent the end of the first cylinder for embracing the second cylinder and sealing it against the passage of fluid therebetween, the second cylinder carrying a seal adapted to bear against the first cylinder, there being clearance space between said cylinders below the last-mentioned seal, a passageway in said second cylinder extending from the space above that cylinder to said clearance space, a valve in said passageway adapted to permit air to pass from said clearance space to the space above said second cylinder consequent upon the extension of such cylinders with respect to each other, a passageway in the wall of said first-named cylinder and a valve in the last-mentioned passageway operating to permit the passage of air from the exterior of the device to said clearance space consequent upon the collapsing of said cylinders.

9. A shock absorber for attachment to the landing gear of an airplane and adapted to pump air into a cylinder as the airplane skips along the ground during a take-off, comprising said cylinder and a head thereon, a second cylinder, a third cylinder rigid with the first-named cylinder and in which the second-named cylinder reciprocates, a piston in the first cylinder, a rod connected to said piston and extending through said head and through a chamber provided by said third cylinder into the second cylinder, a passageway from the exterior into said chamber beneath said head, a passageway in the rod adapted to establish communication between said chamber and the space in the first cylinder between the head and the piston, and a valve controlled passageway in the piston allowing the air between the piston and head to pass through the piston into the space in the first cylinder above the piston as the piston moves toward the head, whereby repeated reciprocations of the piston build up air pressure above the piston.

LUCIEN R. GRUSS.

REFERENCES CITED

The following references are of record in the file of this patent:

UNITED STATES PATENTS

| Number | Name | Date |
|---|---|---|
| 1,055,734 | Funk | Mar. 11, 1913 |
| 1,819,414 | Gruss | Aug. 18, 1931 |
| 1,841,287 | Gruss | Jan. 12, 1932 |
| 1,918,697 | Gruss | July 18, 1933 |
| 1,969,508 | Gruss | Aug. 7, 1934 |
| 2,186,011 | DePort | Jan. 9, 1940 |
| 2,348,160 | Thornhill | May 2, 1944 |

FOREIGN PATENTS

| Number | Country | Date |
|---|---|---|
| 563,913 | France | Oct. 6, 1923 |
| 782,123 | France | Mar. 11, 1935 |
| 852,704 | France | Nov. 9, 1939 |